Oct. 28, 1969    J. R. KNOX ET AL    3,475,307
CONDENSATION OF MONOMER VAPORS TO INCREASE POLYMERIZATION
RATES IN A GLOW DISCHARGE
Filed Feb. 4, 1965    3 Sheets-Sheet 1
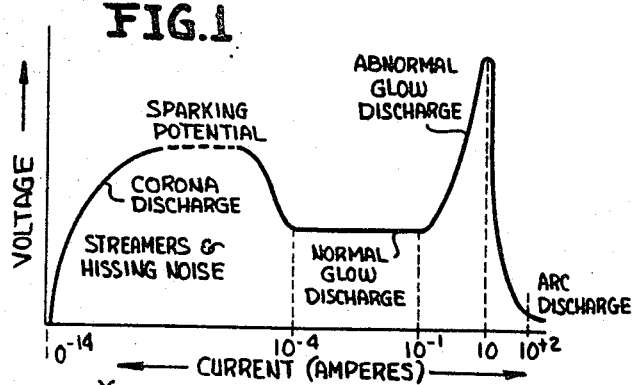
FIG.1
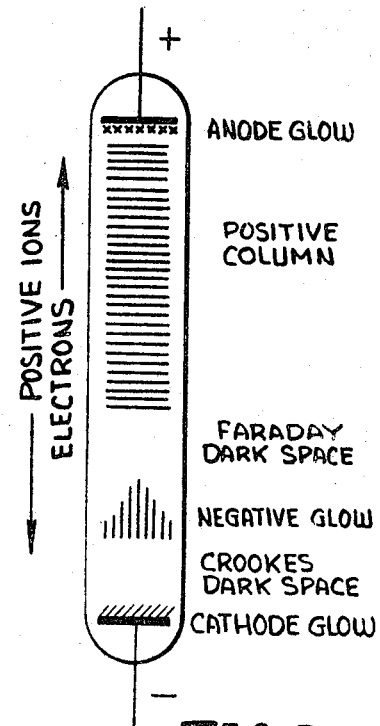
FIG.3
FIG.2  VOLTAGE DISTRIBUTION - GLOW DISCHARGE
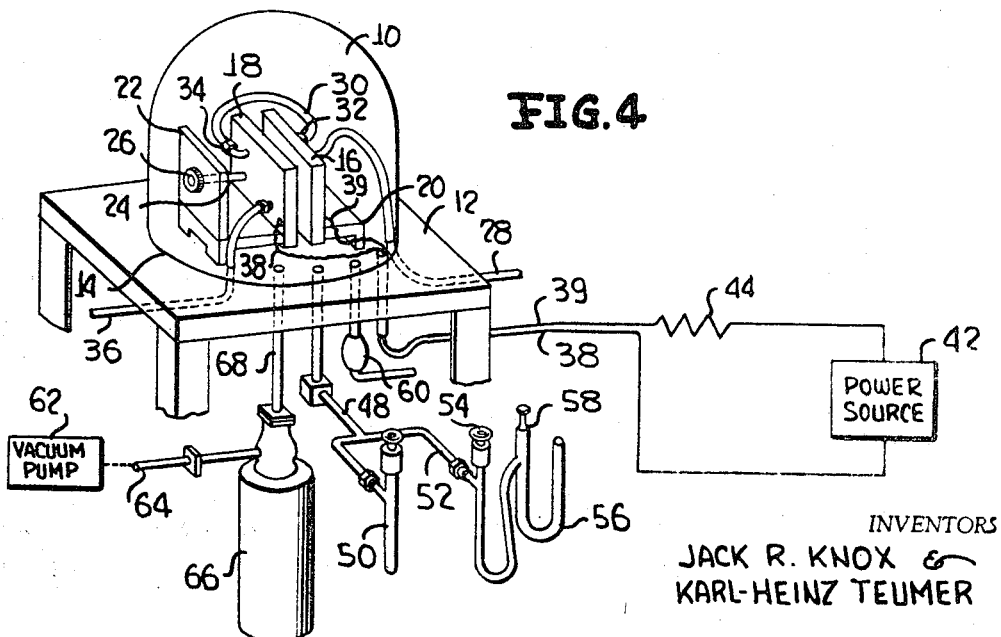
FIG.4
INVENTORS
JACK R. KNOX &
KARL-HEINZ TEUMER
BY
Mason, Porter, Diller & Stewart
ATTORNEYS

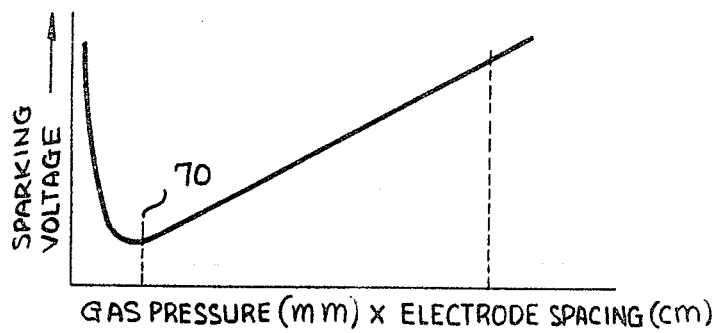
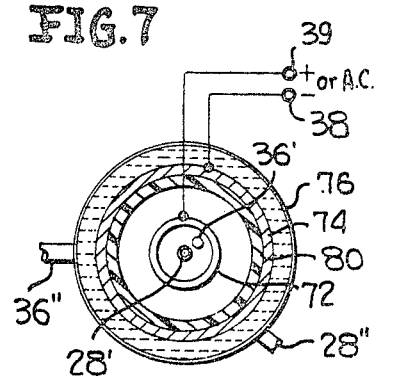
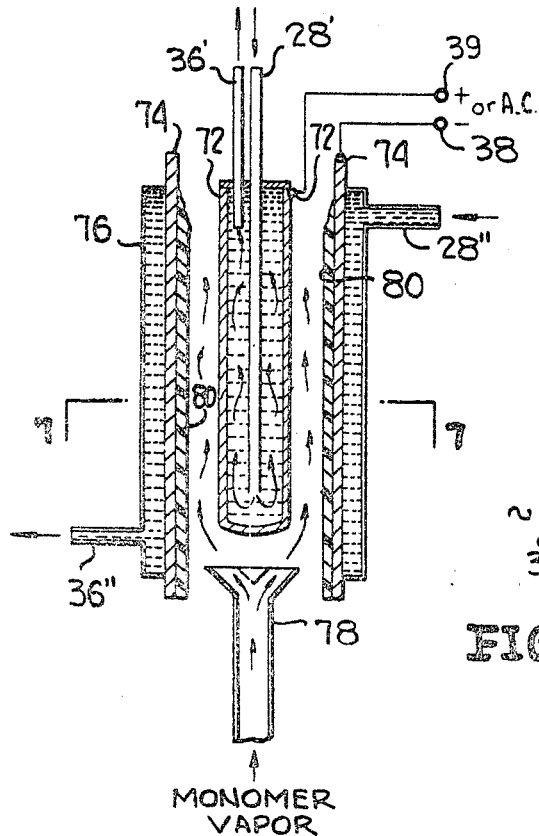
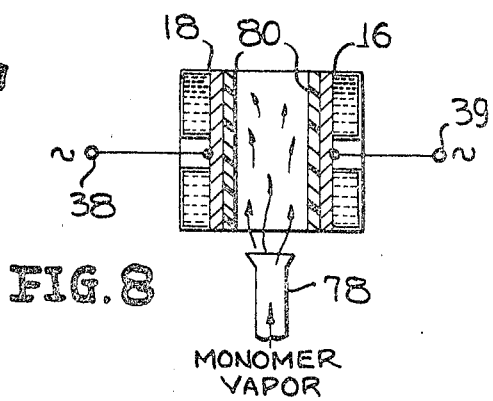

INVENTORS
JACK R. KNOX &
KARL-HEINZ TEUMER

United States Patent Office 3,475,307
Patented Oct. 28, 1969

3,475,307
CONDENSATION OF MONOMER VAPORS TO INCREASE POLYMERIZATION RATES IN A GLOW DISCHARGE
Jack R. Knox, Palos Heights, and Karl-Heinz Teumer, Chicago, Ill., assignors to Continental Can Company, Inc., New York, N.Y., a corporation of New York
Filed Feb. 4, 1965, Ser. No. 430,337
Int. Cl. C07c *3/24;* B01k *1/00;* C23b *13/00*
U.S. Cl. 204—168   4 Claims

ABSTRACT OF THE DISCLOSURE

A polymeric coating is formed on the surface of a substrate by exposing the substrate to an atmosphere of the gaseous monomer from which the polymeric coating is formed, and inducing the polymerization by means of a glow discharge. By maintaining the temperature of the substrate below the condensation temperature of the monomer to cause the monomer to condense thereon, increased deposition rates are achieved.

---

This invention concerns the utilization of an electrical phenomenon to induce polymerization of monomer vapors and more specifically to increasing polymerization rates in a glow discharge by controlling the temperature of a substrate to induce condensation on the substrate.

The invention relates to the article and to a method for forming flexible thin films of solid organic material upon the surface of a substrate through the use of an electrical discharge which discharge is maintained in the glow region of an electrical phenomenon. By maintaining the temperature of the substrate upon which deposition is desired at or slightly below the condensation temperature of the particular monomer employed, increased deposition rates and quality of thin films have been achieved.

The various phenomena of gaseous electrical discharges have been subject of continuing investigation for many years. The use of certain electrical phenomena to produce polymerization of many substances is known. The electrical phenomena referred to are in the form of electrical discharges which are maintained at characteristic voltage, current and pressure relationships. The electrical discharges may be broadly classified as arc, abnormal glow, normal glow and corona. Each of these types of discharges are distinctly different and characterized by unique voltage current parameters which exist during the particular discharge.

An arc discharge is classified as a substantially complete ionization and breakdown between the electrodes which produces a very high current at low voltages. An arc discharge may occur at atmospheric as well as subatmospheric pressures.

A corona discharge may be defined as any field induced ionization that does not result immediately in complete breakdown of the insulation-electrode system in which it occurs. In addition, corona may be defined as a faint illumination adjacent to the surface of an electrical conductor at sufficiently high voltage that results from electrical discharge and indicates an early state of electrical breakdown in the surrounding air or gas. Corona is further characterized by relatively high voltages with relatively low currents and is a reversible process.

The utilization of the glow discharge, to which the present invention is directed, may be defined as a silent discharge without sparks and having a steep potential gradient in the vicinity of the cathode resulting in a potential difference near the cathode which is considerably higher than the ionization potential of the gas.

The typical structure of the flow discharge is identified by a steep potential gradient at the cathode and operating primarily by electron liberation by positive ion bombardment at the cathode. In relation to the corona discharge, a glow discharge is characterized by a much lower potential or voltage and a higher current than the corona discharge. Unlike the corona discharge which is a reversible discharge situation, the glow discharge occurs after the sparking or breakdown potential is exceeded and is an irreversible change which has occurred in the electrical circuit.

The present invention relates to a method for increasing the polymerization rate by condensing a monomer vapor upon a substrate and then subjecting the monomer vapor in the area of the substrate to a glow discharge. The temperature of the electrode or substrate in contact with the electrode is controlled so that maximum polymerization is attained consistent with the higher degree of adherence and uniformity of the polymerized material upon the substrate. An early discovery was that many organic and nonorganic gaseous substances, as well as liquid substances, were modified, degraded or thickened by a discharge of sufficient intensity. Thus, gaseous substances, such as methane, ethane and benzene, and in general the lower alkane gases, have been utilized to produce both liquid and solid products by causing various types of discharges to occur through a body of such gas. Polymerization of such monomers as styrene, methylmethacrylate, allylmethacrylate, divinyl benzene, butadiene, other compounds, and mixtures of the foregoing, is known. The utilization of an electrical discharge in an atmosphere of an organic vapor, such as those set forth, in order to produce a solid, continuous film of an electrode or some substrate in contact with the electrode, has achieved some degree of success. One of the problems in the commercial use of this technique is to obtain a film at a reasonable deposition rate. It is a salient feature of the present invention to show that by the use of electrode or substrate temperatures sufficiently below the condensation temperature of the organic vapor, and by employing an electrical discharge operating in the glow region, that the deposition rate of the polymerized material on the electrode or substrate can be substantially increased.

Gases or vapor are usually adsorbed at a thickness of a few molecules on the surface of a material exposed to the particular gas or vapor. The lowering of the temperature of the exposed material will generally increase this thickness to some degree. Glow discharge polymerization may be achieved by causing an ionization of the gas or vapor in the area between the electrodes (or the substrate in contact with the electrodes) and the resulting impingement of the activated molecules or ions on the cathode will produce the polymerization. Part of the energy of this ion or activated molecule initiates a polymerization with the adsorbed, unactivated gas or vapor condensed upon the substrate. The major part of the energy of this reaction is dissipated as heat at the cathode, thus raising the cathode temperature. This rise in temperature of the cathode decrease the thickness of the adsorbed gas or vapor layer and, thus decreases the number of unactivated molecules available for polymerization by the ions or activated molecules being propelled against the cathode.

Although the temperature in the area in which the polymerization is taking place may be controlled, the localized heating of the cathode raises its temperature to a degree at which the monomer vapors are driven off. By circulation of a coolant through the electrode in contact with the substrate to be coated, the heat generated by impingement of the ions or activated molecules may be removed. If the temperature is lowered sufficiently, the vapor molecules will condense to a liquid on the substrate, in addition to the thin layer developed by adsorption. This greatly increases the number of unactivated molecules available for polymerization.

During the course of a run at condensation temperature, the cathode and condensed material may be heated due to the impingement of the activated molecules so that longer flow periods of the gas do not necessarily give unit time rates which are equivalent to shorter periods of exposure to the glow discharge. That is, although a longer flow period of the gas or vapor is employed, the time rate of deposition is not increased significantly due to the rise in temperature of the cathode or substrate upon which the deposition is desired. Also, if the substrate is cooled to too low a temperature, so that too thick a liquid layer is formed, the polymer in some instances will be formed only at the surface and will not remain as a coating, but will separate from the substrate upon subsequent warming and/or flexing. In other cases, only low molecular weight material will be formed, leading to a gummy coating which loses weight upon heating.

If direct current is employed in the practice of the present invention, the magnitude of the voltage would be sufficient to exceed the breakdown voltage of the system but in a range so that the electrical discharge is maintained within the normal glow or the abnormal glow regions. Similarly, if an alternating current is applied, the signal would be sufficient to maintain the system in these regions.

Accordingly, it is the principal object of the present invention to improve polymerization techniques through the utilization of an electrical discharge operating in the glow region.

It is a further object of the present invention to improve polymerization techniques through the use of an electrical discharge operating in the glow region to activate molecules capable of initiating polymerization.

It is a further object of the present invention to increase polymerization rates by the use of electrode cooling to increase condensation at the electrodes.

It is a further object of the present invention to improve polymerization techniques through the use of an electrical discharge operating in the glow region to activate molecules capable of initiating polymerization of molecules condensed upon a substrate.

It is a further object of the present invention to improve polymerization techniques by maintaining a substrate at a temperature below the condensation temperature of a gas to cause a gas to condense thereon and then initiating a glow discharge about the substrate for activating gas molecules to initiate polymerization of the condensed gas on the substrate.

It is a further object of the present invention to improve polymerization techniques through the use of an electrical discharge operating in the glow region and at sub-atmospheric pressure to activiate molecules capable of initiating polymermization.

It is a further object of the present invention to provide a substrate coated with a polymer in which polymerization is induced by a glow discharge.

It is still a further object of the present invention to provide a substrate coated with a polymer having a high degree of adherence to the substrate under conditions of flexing and bending.

In a preferred embodiment of the invention, the coating apparatus is maintained in an atmosphere of reduced pressure. A pair of parallel plane electrodes in spatial relationship is maintained at a temperature slightly below the condensation temperature of the monomer or material in which polymerization is desired. After the system has attained stability, the gas or vapor of the material to be polymerized is then introduced into the area between the electrodes. In the event that a substrate is to be coated, the substrate would be in intimate contact with the electrodes and the vapor of the monomer would then be introduced in the area between the substrates. In a very short period of time, a thin layer of a few molecules thickness of the material to be polymerized would condense on the cooled electrodes or substrate and the potential is then applied across the electrodes. The resulting electric field set up between the electrodes produces ionization of the incoming or non-condensed material causing these molecules to be activated and to be propelled against the electrodes (the alternate cathodes when employing alternating current and the cathode when employing direct current) with a force sufficient to commence polymerization of the condensed material already present on the electrodes. Care is exercised with the electrical paramaters to maintain the electrical discharge between the electrodes within the glow or abnormal glow regions. As the coating of the polymerized material builds up on the electrodes, the glow discharge will produce activated molecules or ions which may either cause polymerization with unactivated molecules on the cooled electrodes or may polymerize with other activated ions and, thus, build up the polymer coating on the electrodes or substrates.

The foregoing embodiment employing parallel plane electrodes and substrates may be modified for use with cylindrical electrodes or substrates. A similar sequence op operation is maintained except that the polymer coating is now formed on the inside of the outer electrode or substrate and on the outside of the inner electrode or substrate. A significant feature of either embodiment is that the electrode or electrodes (or substrates) are maintained at a temperature slightly below the condensation temperature of the monomer being employed and, in addition, the electrical discharge is maintained within the glow region.

The invention, both as to its organization and method of operation, together with further objects and advantages thereof, will best be understood by reference to the following specification taken in conjunction with the accompanying drawings, in which:

FIGURE 1 is a graph of a voltage versus current and depicting the dependence of voltage upon current for the corona, normal glow, abnormal glow and arcs discharges in gases;

FIGURE 2 is a graph showing the voltage distribution in the space between the electrodes of a glow discharge;

FIGURE 3 is an elevation view of a tube and illustrating details of a direct current glow discharge;

FIGURE 4 is a perspective view of an apparatus for carrying out the process of the present invention in which the flexible and highly adherent polymer coatings may be deposited upon electrodes or other substances;

FIGURE 5 is a graph of voltage versus the product of the gas pressure and the electrode spacing and depicting the sparking potential which must be exceeded in order to obtain a glow discharge;

FIGURE 6 is a cross-sectional elevation view of a cylindrical electrode arrangement;

FIGURE 7 is a sectional view taken along the line 7—7 of FIGURE 6;

FIGURE 8 is a cross-sectional view of parallel plane electrodes;

Figure 9:
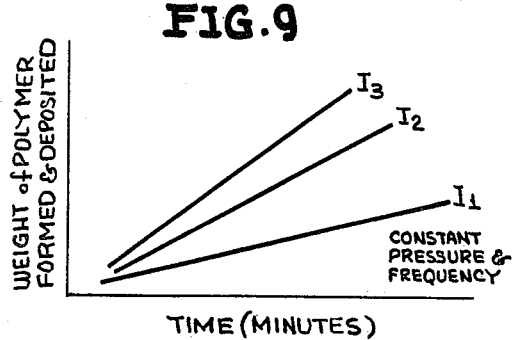
FIGURE 9 is a graph of weight of polymer formed and deposited versus time for a plurality of current density values.
Figure 10:
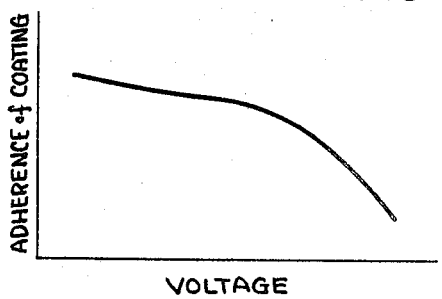
FIGURE 10 is a graph of adherence of coating versus the voltage.
Figure 11:
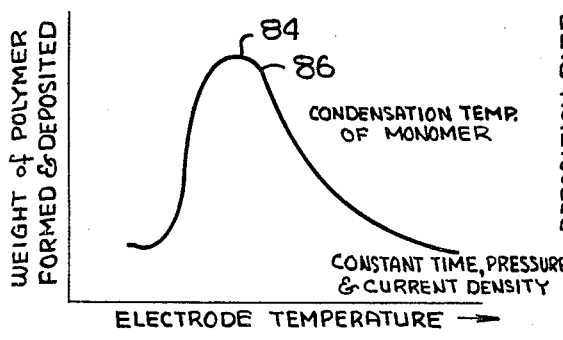
FIGURE 11 is a graph of weight of polymer formed and deposited versus the electrode temperature at a constant time, pressure and current density.
Figure 12:
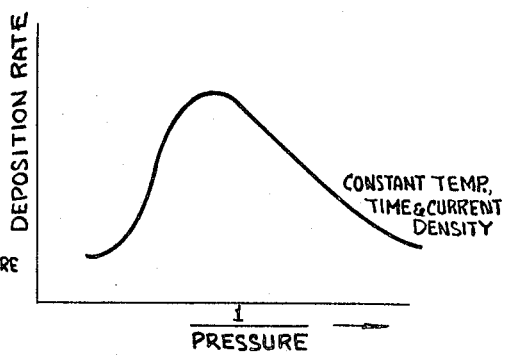
FIGURE 12 is a graph of deposition rate versus the reciprocal of the pressure at a constant temperature, time and current density.
Figure 13:
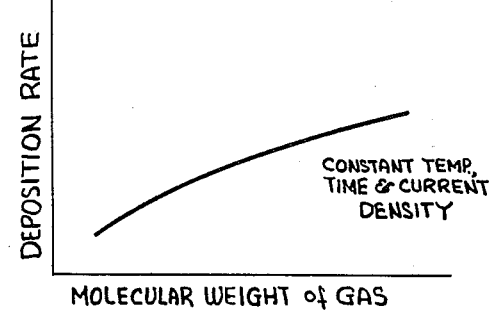
FIGURE 13 is a graph of deposition rate versus the molecular weight of a gas at constant temperature, time and current density.

Throughout the figures which illustrate various graphs of operating parameters, the proportional representation has been drawn for demonstrative purposes and not for a true representation of the stated quantities for electrical parameters. The graphs are intended to show the various relationships between the parameters selected for the respective ordinate and abscissa.

This invention relates to polymerization induced upon a cooled electrode through a glow discharge. With reference to the FIGURE 1, it will be noted that each of are areas of corona, glow, abnormal glow and arc, are distinctly maintained through the manipulation of the voltage and current relationship. A glow discharge may be defined as a steady state luminous gaseous discharge, generally appearing at reduced pressures, characterized by relatively low densities, relatively high potential, gradients, and having a typical structure marked by a steep potential gradient at the cathode. A glow discharge is maintained primarily by electron liberation by positive high bombardment at the cathode. It is initiated in most cases by a spark-like breakdown and can be stabilized immediately into a self-sustaining glow by means of a current limiting resistor in the external electrical circuit. The voltage required for spark breakdown was found by Paschen to be proportional to the product of pressure and the electrode gap distance. The proportionality is not the same for all field strength-to-pressure ratios due to the varying contributions of different ionization mechanisms. However, for all gases the relationship has been found to have the shape shown in the FIGURE 5. It will be noted in FIGURE 1 that each of the areas of arc, abnormal glow, normal glow and corona are distinct and maintained through the manipulation of the voltage and current relationship. A very small current flow is observed at zero voltage which is due to random ionization, such as that ionization caused by cosmic rays. As the potential is increased, the potential gradient close to the anode becomes sufficient to produce ionization near the anode and a corona is produced at the anode surface. As the potential is increased further, occasional streamers and a hissing noise are produced, which are illustrated on the curve of the FIGURE 1. Thus, the corona discharge region is established along the portion of the curve indicated in the area of very small current but relatively high voltage.

As the voltage or potential is further increased, the sparking potential or breakdown voltage is reached at which point the voltage abruptly decreases with a resulting increase in current. The system is now in the normal glow discharge region. As the sparking potential or breakdown voltage is reached or exceeded, an irreversible change occurs in the electrical circuitry. If the geometry, pressure and electrode material are suitable, a glow discharge will be produced as indicated at the normal glow discharge region of the curve of the FIGURE 1. The region between the sparking potential and the normal glow discharge region is unstable in that once the sparking or breakdown potential is exceeded, the system irreversibly is driven into the normal glow discharge which is characterized by a smaller voltage than the corona discharge region but is of higher current. The bombardment of the cathode by positive ions produces electron emission from the cathod which causes the glow discharge to be a stable phenomenon.

Continuing further, as the voltage is increased from the voltage required to maintain the normal glow, a large increase in voltage results in a relatively small increase in current. As shown by the curve of the FIGURE 1, the abnormal glow discharge region is reached and a further increase in the voltage from the abnormal glow discharge region, causes the system to arc at which a very high current flows and the voltage drops very abruptly toward zero. The arc discharge is, in many cases, a violent eruption and may result in the removal of more than the desired material from electrodes.

FIGURE 2 is a graph of the potential gradient in the space between the electrodes of a glow discharge and the FIGURE 3 is an elevational view of a glow discharge tube. Consider that the tube of the FIGURE 3 is filled with a gas at a pressure between approximately 0.01 and 5 mm. Hg and a high potential D.C. source of about 1000 volts is supplied across the electrodes. These conditions are adequate to maintain the discharge in the glow region and the external power supply is so regulated that the glow just covers the surface of the cathode. With reference to the potential gradient of the FIGURE 2 and the tube of the FIGURE 3, the following will be observed. The surface of the cathode is covered by a thin, luminous sheath called the cathode glow. Its light is derived from the action of positive ions which are being neutralized at the cathode and bounce off its surface emitting their energy of excitation as light. The cathode glow is not known to have any functional importance in the operation of the discharge.

Adjacent to the cathode glow and toward the anode, there is a relatively dark region in the gas, known as the Crookes dark space. Its volume decreases as pressure increases. As shown in the FIGURE 2, there is a sharp rise in potential across this dark space from the cathode to the negative glow, which is the next visible region. When the cathode is not completely covered by a glow, this rise in potential is called the normal glow voltage and is essentially constant, being dependent only upon the ionization potential of the gas, pressure, and the secondary emission coefficient of the cathode. As the current increases, the area of the cathode covered by the glow increases so that the current density remains constant. When the cathode is completely covered, an increase in current leads to an intensification of the normal processes so that the glow voltage increases and is then called the "abnormal" glow voltage. It will be recalled that the abnormal glow discharge was shown in the FIGURE 1.

In a glow discharge, the high glow voltage across the Crookes dark space causes a rapid acceleration of electrons from the cathods, which leaves a heavy positive space charge due to the great influx of slow positive ions from the negative glow and positive column. These positive ions are greatly accelerated in the dark space by the electric field and gain in energy level approaching the glow voltage, since collisions with molecules are not very frequent in this region. These ions strike the cathode at high energy and liberate a number of electrons equal to the secondary emission coefficient. Since the glow voltage is relatively large, it is estimated that over 90% of the electron emission from the cathode is via the secondary emission process. Since the secondary emission coefficient is small, the number of electrons emitted is quite small compared to the number of ions. The number of impacts the electrons make in the Crookes dark space is relatively small.

When these electrons gain energy equal to approximately the glow voltage, they begin to collide with neutral molecules to produce ions and slower electrons in the region known as the negative glow, shown in FIGURES 2 and 3. The high potential gradient of the Crookes dark space is thus reduced at the cathode end of the negative glow region and some of the directive action of the field is lost. The electrons then experience random scattering as their energy is expended by creation of several ions and electrons. This negative glow region is nearly electrically neutral with an excess of slow electrons toward the anode end. Due to high ion densities, some recombinations of electrons and positive ions occur which produces the glow. This negative glow region furnishes practically all the ions needed to sustain the discharge.

The Faraday dark space has a small but sharp potential rise in which the electrons formed in the negative glow are accelerated to the point where they may ionize a neutral molecule. Since this is a region of low electron acceleration, the density of excitation and ionization is small so that the space is dark.

The positive column of the FIGURES 2 and 3, is a conducting and luminous mass or plasma of ionized gas. It obtains most of its electrons from the Faraday dark space and its positive ions from the anode dark space. This is the region where most electron-positive ion recombination occurs due to the relatively slow velocity of the positive ions and electrons in this region. In addition, there is considerable diffusion to the wall followed by recombination of the ions and electrons. This is the region in the glow discharge that is extensible by increasing the distance between electrodes, and it is this region which is utilized and observed in neon signs. The positive column has relatively little importance in the glow discharge process for producing protective coatings as set out in the present invention. The Crookes dark space and the negative glow are the two most important regions concerned with the production of polymerized coatings on substrates or electrodes.

The anode dark space and the anode glow are usually considered together since the anode dark space is rarely visible. In the anode dark space, the electrons are given a final acceleration to produce positive ions by bombardment in the anode glow region. A potential rise in this region is determined mostly by the ionizing potential of the neutral molecule, which is small compared to the glow voltage potential.

The foregoing description relates to glow discharges in gases such as neon. It has been found, that when organic hydrocarbon vapors are subjected to an electrical glow discharge, chemical reactions occur as well as ion-electron interactions. In most cases, solid deposits are formed on the electrodes whose yield in composition vary as a function of the operating conditions of the glow discharge. According to the teaching of the present invention, it has been found that increased yields and greater adherence of the coatings to the electrodes or substrates in contact with the electrodes are achieved through the technique of maintaining the electrodes slightly below the condensation temperature of the particular monomer employed.

Consider for example the apparatus of the FIGURE 4. A bell jar 10 is secured to a base plate 12 with interposed gasket material or stop cock grease at the position 14 for providing a gas-tight connection therebetween. A pair of plate holders 16 and 18 are supported inside the bell jar 10 on a mounting plate 20. The holding plate 18 is slidably supported on the mounting plate 20 and is connected to an end plate 22 by a screw 24 which passes through the end plate 22 and is in threaded engagement therewith. A knurled knob 26 is provided on the unconnected end of the screw 24 for ease in adjusting the spacing between the holding plates 16 and 18. By rotation of the knurled knob 26, the spacing between the holding plates 16 and 18 may be varied over a substantial distance. If it is desired that the holding plate 16 also be movable with respect to the holding plate 18, then a similar screw, knurled knob and end plate would be provided for the holding plate 16. The holding plates 16 and 18 form the electrodes of the apparatus and may receive the polymerized coating or a substrate may be inserted between the plate holders 16 and 18 and in engagement with their respective electrodes. The substrates supported against the plate holders 16 and 18 may be of metal, paper, or other composition.

The holding plates 16 and 18 are of hollow construction so as to permit a cooling fluid to be circulated therethrough. A coolant fluid inlet 28 is shown passing through the under surface of the base plate 12 and into the outside surface of the holding plate 16. A connecting conduit 30 connects a rear port 32 of the holding plate 16 with a rear port 34 of the holding plate 18. An exit coolant conduit 36 is connected to the outside surface of the holding plate 18 and passes through the plate 12 to a reservoir (not shown). In the particular embodiment set forth, the supply of coolant to the plate holders 16 and 18 was in series relationship. However, it will be readily understood that the plate holders may be supplied with coolant by a parallel relationship.

The cooling fluid flowing through the cooling system permits a desired temperature to be maintained on the plate holders 16 and 18. The coolant extracts the heat built up in the electrode pieces upon which the coating is to be deposited by the glow discharge. The deposition of the activated ions due to the electrical discharge upon the electrodes inherently increases the temperature of the electrodes and if the temperature of the electrodes is to be maintained below the condensation temperature of the particular monomer, then the coolant must remove the heat and maintain the temperature at the desired range.

A pair of electrical leads 38 and 39 are coupled from a power source 42 through a current limiting resistor 44 to the holding plates 16 and 18, respectively, within the apparatus surrounded by the bell jar 10. It will be understood that the power source 42 will be of sufficient magnitude to produce a glow between the electrodes or holding plates 16 and 18. Further, the power source 42 is able to supply a variable voltage from D.C. through 100K or more cycles per second.

The substrate or electrode pieces which are to be coated according to the teaching of the present invention are clipped or secured in any suitable manner to the opposing surfaces of the holding plates 16 and 18. The electrode pieces, in the parallel plane embodiment, comprise flat metal rectangular sheets which entirely cover the opposed surfaces of the holding plates 16 and 18. The electrode pieces may be fabricated from tinplate, black plate, aluminum or other common metals which are used for metal fabrication. Also, paper may be employed although a larger voltage is required due to the capacitive effect of the paper. Since the electrode pieces or substrates are in direct contact with the holding plates 16 and 18, the electrical connections between the electrode pieces and the holding plates 16 and 18 are sufficient to permit the passage of current from the power source 42 without arcing or sparking.

After the coolant has been circulated through the holding plates 16 and 18 and the electrode pieces or substrates have attained a temperature slightly below the condensation temperature of the monomer to be polymerized, and the coating has been deposited upon the electrode pieces or substrates, they may be removed from the holding plates 16 and 18 and other uncoated electrode pieces inserted for the next coating operation. In this manner, the apparatus of the FIGURE 4 may be used repeatedly to produce specimens according to the present invention. Further, it will be understood that this step-wise method of coating the electrode pieces is not to be taken as limitative upon the invention, it being understood that a continuous process may be employed or that cylindrical electrodes may be utilized in place of the parallel plane electrodes.

A gas conduit 48 is connected to the area under the bell jar 10 through the base plate 12 and has at the exterior end thereof a holding vessel 50 for the storage of an activable vaporizable material. An intermediate conduit 52 is provided with an air bleed valve 54 connected between a moisture absorber tube 56 and the main conduit 48. A needle valve 58 is interposed in the line from the absorber 56 to the air bleed valve 54 for regulation of minute quantities of dry air into the space in the interior of the bell jar 10 for raising the pressure inside the bell jar 10 to atmospheric during removal of the coated pieces. A gauge may be connected through the conduit 60 for measuring the pressure within the bell jar 10. Although not shown, it is understood that thermocouples may be introduced for measuring temperature in any desired area.

A vacuum pump 62 is connected through a conduit 64 to a Dry Ice-acetone trap bottle 66 which is connected to the area within the bell jar 10 by a conduit 68.

The FIGURE 5 is a graph showing the voltage required for a spark breakdown in a gas between two electrodes. The voltage is plotted as the ordinate while the abscissa is the product of the gas pressure in millimeters times the electrode spacing in centimeters. The voltage required for spark breakdown was found in 1889 by F. Paschen to be proportional to the product of pressure and the gap distance. The proportionality is not the same for all field strength-to-pressure ratios due to the varying contributions of different ionization mechanism. However, for all gases the relationship has been found to have the shape shown in the FIGURE 5. The region for most stable operation of a glow discharge is at a pressure times distance value slightly higher than that at the minimum of the curve.

An alternate embodiment is shown in the FIGURES 6 and 7. In this embodiment, cylindrical concentric electrodes are utilized in place of the parallel plane electrodes of the apparatus of the FIGURE 4. An inside cylindrical electrode 72 has a closed top end and a closed bottom end. Cooling fluid is circulated through the hollow electrode 72 via the cooling inlet 28' and discharged through the exit conduit 36'. Of slightly larger diameter is an outside holding plate or electrode 74 which is surrounded by a similar cylindrical cooling chamber 76. Cooling fluid may enter via an entrance conduit 28'' and the fluid may exit through the exit conduit 36''. The monomer vapor may be introduced through a dispersing funnel 78 to the area between the plate holders or electrodes 72 and 74. A source of electrical energy either of direct current or alternating current is applied to the terminals 38 and 39 for application to the outside and the inside plate holders or electrodes, respectively. In the FIGURES 6 and 7, a polymerized coating is shown being formed on the inside surface of the outside electrode 74 and the polymerized coating is identified as 80. The coating 80 forms on the cathode when direct current is applied to the terminals 38 and 39 and in the event that alternating current is applied to these terminals, a similar coating 80 would be deposited upon the inside plate holder or electrode 72. It will be readily understood that substrates or electrodes may surround the plate holders 72 and 74 and that the coating would be deposited upon the substrate or that the material to be deposited upon may form one electrode as shown in the FIGURES 6 and 7. Further, it will be understood that the plate holders 74 could be advanced and coated continuously or could be inserted in the position shown and removed after the coating process is completed. In addition, an arrangement may be devised wherein the inside electrode is easily removable.

Figure 14:
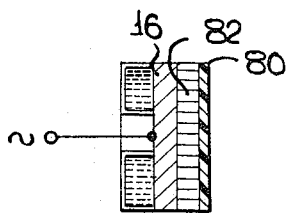
FIGURE 14 is a cross-sectional view of a single electrode showing the coating deposited on a substrate positioned adjacent an electrode.

The FIGURE 8 is an elevational cross-sectional view of the plate holders of the FIGURE 4. The holding plates 16 and 18 are surrounded by the fluid chambers and to which a coating 80 has started to build up due to the polymerization of the monomer vapor introduced through the tube 78. In the FIGURE 14, a substrate 82 has been affixed to the holding plate or electrode 16 in any suitable manner so that the coating 80 now builds up upon the substrate 82. As recited earlier, the substrate 82 may be of metal, plastic or even of paper.

The FIGURES 9 through 13 are graphs showing the effects of varying various parameters in the operation of the system of the FIGURE 4. The controllable variables which govern deposition rates and coating qualities may be divided into electrical, physical and chemical groups.

The electrical variables which effect the deposition rate and the coating quality are voltage, current density and frequency. Increasing the current density so that the operation occurs in the abnormal glow region (see the FIGURE 1) rather than the normal glow region increases the rate at which the deposit forms on the electrode. This is due simply to the increased number of ions available to carry the current. Examples of this effect as well as the effect of time are clearly shown in FIGURE 9. In order to increase the current density into this abnormal region, the voltage must be increased and the associated detrimental effects of a high voltage limits the extent to which the current density may be raised.

As the voltage increases, positive ions are accelerated with increasing energy. This leads to impact on the already coated cathode surface which can degrade the film beyond a useful point. Not only are cross-link-initiating sites produced in the already formed film, but long chain molecular weight compounds are ruptured, leading to brittleness and flakiness. As shown by the FIGURE 10, increasing voltage beyond a useful range of a few thousand volts, results in less adherence of the coating to the substrate or electrode. In addition, the increased acceleration given to the electrons traversing the Crookes dark space gives them sufficient energy to rupture normally stable bonds which are desirable in the final coating. For example, it has been found that as the operating potential is increased, the amount of aromatic character in a coating produced from benzene decreases. The aromatic ring has been ruptured in the glow in addition to excitation of the vinyl bond.

In regard to frequency, a change in the frequency effects both the rate of deposition and the quality of the coating. It will be intuitively clear that alternating current is required from the standpoint of coating uniformity between the cathode and the anode. In addition, as the organic coating builds up on the cathode in a D.C. discharge, a dielectric film is constructed across which sufficient voltage drop occurs to extinguish the glow. By operation at high frequencies, the potential drop across this film is reduced to the point where the glow can be maintained. If the frequency is operated too high, however, then the transit time of a large positive ion is greater than the field reversal time and the deposit is built up mostly from cathode recombination of smaller positive ions. In this case, not only is deposition rate decreased but the coating quality is changed.

The major physical variables effecting the deposition rate and coating quality are the temperature of the material to be coated, the pressure and the gas throughput rate. One of the salient features of the present invention is the temperature control of the electrode or substrate upon which deposition is required. It has been found that by maintaining the electrode or substrate slightly below the condensation temperature of the monomer employed, condensation of the electrode or substrate will take place so that a sufficient quantity of molecules are available upon the substrate for polymerization. As shown in the FIGURE 11, the graph of the weight of the polymer formed and deposited versus the electrode temperature shows that a maximum weight is accomplished, at a constant time and current density, at an electrode temperature indicated at 84 where the condensation temperature of the monomer is slightly higher and indicated at 86. If the electrode is too cold, then too much of the monomer is condensed upon the electrode or substrate and the incoming activated molecules never reach the monomer condensed adjacent a surface of the electrode for polymerization. In this instance, a coating of little adherence to the electrode or substrate is achieved.

The pressure effects the deposition rate in two ways. It effects the thickness of the adsorbed layer of gas on the electrode and thus effects the ratio of neutral molecules to ions at the cathode surface. By increasing the propagating species for a constant number of initiating species (determined by current density) the deposition rate is slightly increased. As shown in the FIGURE 12, the deposition rate is plotted against the reciprocal of the pressure. As shown by that figure, a definite peak in the deposition rate is maintained and this peak is in the range of approximately 1 to 5 mm. Hg. An increase in pressure also increases the number of neutral molecules in the glow region itself, and thus leads to additional ion-molecule collisions in the gas. Ion-molecule collisions lead to polymerization in the gas which produces milky coatings as well as loss of polymerized material to the walls of the vessel. Again, there is a limit to increased pressure from a coating standpoint as well as from the breakdown potential standpoint already discussed.

Gas throughput rate effects deposition rate in that low throughput rates or rate of flows allow the formation and concentration of new stable molecules such as hydrogen in the glow. By charge transfer, the number of polymerizable, positive ions reaching the electrode per unit time is changed. Coating quality is likewise affected by bombardment of cathode coatings by differing positive ions, which may or may not be incorporated.

The chemical variables which effect the rate of deposition and the coating quality are the chemical structure of the gas and the chemical structure of the substrate. The chemical nature of the gas has an effect both from a molecular weight standpoint and a molecular structure standpoint. A large weight molecule ion will bring a greater amount of material to the electrode per unit time for a given current density. Thus, deposition rates are increased by the use of higher molecular weight gases. As shown in the FIGURE 13, as the molecular weight of the gas increases, the deposition rate appears to similarly increase. For gases such as styrene and ethylbenzene that are the same except for the vinyl unsaturation in styrene, the deposits formed have the same infrared spectra. The rate is somewhat slower for ethylbenzene since it is not normally a polymerizable monomer like styrene. On the other hand, ethylbenzene forms less milkiness in the coating since it is not so prone to form a polymer in the gas phase as is styrene.

The chemical nature of the substrate affects the adherence of the coatings much more than it does the structure of the coatings. Gases having no polar groups tend to be less adherent, for example, to tinplate and aluminum than those gases containing polar groups. Also, adsorption of the gas molecules by paper tends to occur in the interstices of the paper and some paper is exposed to bombardment by positive ions, leading to emission of electrons from the paper. This produces reactive sites in the paper itself so that coatings on paper tend to be, at least in part, chemically bound to the paper.

The operation of the system along with a number of examples will be described. The apparatus of the FIGURE 4 will be employed along with parallel plane electrodes although cylindrical electrodes may be employed as previously set forth. The plate holders 16 and 18 will have secured thereto rectangular or square metal pieces, such as tinplate, black plate or aluminum which will serve as the substrate and upon which the coating will be deposited. For parallel plane electrodes, the electrode spacing will be approximately ½ cm. to 5 cm. For concentric or cylindrical electrodes, the maximum range would be approximately two centimeters.

The pressure system would be actuated so that a pressure may be reached at which the glow discharge would be supported. The pressure range for the glow discharge would be from approximately ½ mm. to 10 mm. and during the time that the system under the bell jar 10 is reaching pressure stability, the cooling fluid would be circulated so as to reduce the temperature of the plate holders 16 and 18 below that of the condensation temperature of the monomer. A temperature range for the electrodes or plate holders 16 and 18 would be from −75° C. to 30° C. depending upon the particular monomer employed. Sufficient condensation on the electrodes is accomplished by maintaining the temperature of the electrodes from 1 to 3 degrees below the condensation temperature of the selected monomer at the pressure maintained within the bell jar 10.

A broad range of gases of monomers may be employed. In theory, any vaporizable compound containing carbon and at least one hydrogen, or silicon and at least one hydrogen or mixtures of vaporizable compounds in which the mixture contains carbon and at least one hydrogen, or silicon and at least one hydrogen may be polymerized. Successful coatings have been accomplished by using styrene, methylmethacrylate, allylmethacrylate, divinyl benzene, and butadiene.

After the system has reached a pressure and temperature stability, and the monomer has been selected, the monomer is introduced into the area between the substrate at a rate at least sufficient so as to maintain a substantially constant pressure between the electrodes. The voltage is now applied to the terminals 38 and 39 for developing a potential gradient across the substrates affixed to the plate holders 16 and 18. When using an organic material the voltage range would be from 200 volts through approximately 2000 volts. By operating the electrical discharge in the abnormal glow region (FIGURE 1), a greater quantity of active species is created from the activable gas than would be created at the normal glow condition. The greater number and, therefore, proportion of the active species (ionized) to the neutral gas molecules at constant pressure, would tend to furnish reactive sites for other neutral activable gas molecules and would, hence, cause a combination of the molecules in the glow region and at the surface of the electrodes in rather short and multitudinous molecular forms. Such short molecular forms would tend to produce a grainy or brittle organic coating which would be highly cross-linked and, therefore, would not be flexible or fabricable with the underlying metallic electrode upon which the deposit occurred. Such a coating would be of low commercial utility in that it could not be bent and fabricated with the underlying metallic substrate. According to the present invention, the condensation of the monomer upon a substrate prior to the generation of the active species tends to provide a sufficient quantity of polymerizable material for interaction with the active species to produce a highly adherent and flexible coating.

If direct current is employed, then the majority of the coating is deposited at the cathode. In actual practice, it is desired to make the process as efficient as possible so that an alternating current would be employed in order to achieve deposition upon both of the substrates. Accordingly, the frequency range may extend to 100,000 cycles. Depending upon the operating voltage, a current density of the range 0.05 milliampere per square centimeter to 7 milliamperes per square centimeter would be attained. The current density is somewhat of a critical electrical parameter due to the fact that a proper electrical glow discharge will not occur at very low current density values and an unstable or arcing electrical discharge will occur at too high values of current density. The elapsed time over which the electrical energy is applied across the substrates is in the range of one second to ten minutes. At fairly high current densities, a lower time would be required to achieve the desired coating. At very low current densities, a greater time would be required. However, utilizing optimum voltage-current parameters, after approximately one minute, only a slow build up of the coating would be accomplished by further exposure to the activated species due to the glow discharge produced between the electrodes or substrates.

At the end of the run, the voltage would be removed, the bell jar brought up to atmospheric pressures that the coated substrates could be removed. The following examples of practice are intended to be descriptive of various manners in which the method of this invention may be used to produce the flexible coating as taught by the present invention. The examples of practice are not intended to be limitative of applicants' invention. In all the data, the electrical variables are expressed as peak-to-peak values.

EXAMPLE I

Two sheets of bare tinplate, each approximately 7 square inches in area, were positioned approximately 0.7 cm. apart and affixed to the plate holders in the bell jar chamber which was maintanied at 2.25 to 2.5 mm. Hg pressure of styrene vapor. Each of the sheets of tinplate was in intimate contact with a copper back electrode (a holding plate) containing a copper cooling coil. Water was circulated through the cooling coil so that the coolant outflow temperature was 8° C. At 2.25 mm. of pressure, the condensation temperature of styrene is 9° C., so that condensation would occur on all surfaces cooler than 9° C. The glow discharge was initiated by increasing the power to the two electrodes at a frequency of 6 kilocycles until the glow started. The voltage was approximately 1000 volts and the power was adjusted so that a total glow current of approximately 100 milliamperes was flowing. After two minutes of glow, the power was turned off, the chamber was opened to the atmosphere and the coated plates were removed. A coating weight of 31.0 milligrams had been deposited on one plate and 34.8 milligrams on the other plate. This is equivalent to an average coating rate of 23.5 micrograms per minute-milliamperes-inch$^2$. The coatings adhered well and remained bonded to the substrates upon flexing and bending. The coatings were somewhat foggy but this fogginess was just a matter of appearance and in no way detracted from the quality of the coating.

EXAMPLE II

In this example, the conditions were identical with those of Example I; however, the time of the glow discharge was reduced to one minute. Upon subsequent weighing, the coating weights were found to be 35.7 mg. and 29.1 mg. which was equivalent to an average coating rate of 46.3 micrograms per minute-milliamperes-inches $^2$. The quality and appearance of the coatings were similar to those of Example I.

EXAMPLE III

The conditions for this example were identical with those of Example I except that the pressure was maintained at 2.0 mm. At this pressure the condensation temperature of styrene is 7° C. Since the electrodes are maintained above the condensation temperature of the monomer employed or at 8° C., little condensation should occur and the subsequent average coating rate should be smaller than that of Example I wherein the electrode was maintained at a temperature below the condensation temperature of the monomer employed. This reasoning was found to be correct in that subsequent weighing revealed that coating weights of 21.1 mg. and 20.9 mg. were obtained which were equilavent to an average coating rate of 15.0 micrograms per minute-milliamperes-inches $^2$. The quality and appearance of the coatings were similar to those in the previous examples.

EXAMPLE IV

The conditions for this example were identical to those of Example II except that the coolant outflow temperature was raised to 22° C. and the voltage was raised to 1200 volts. It will be noted that the electrode or substrate temperature is now approximately 13° C. above the condensation temperature of the monomer styrene so that substantially no condensation of the monomer on the electrodes takes place and any resulting coating would be derived from polymerization of activated ions or active species rather than the combination of the consensed molecules and the activated species. The coating weights in this example were found to be 4.2 mg. and 4.3 mg. which were equivalent to an average coating rate of 6.1 micrograms per minute-milliamperes-inches $^2$. The coatings adhered well upon flexing and were substantially transparent.

EXAMPLE V

In this example, the conditions are identical to those of Example I except that the substrate to receive the coating is maintained at approximately −20° C. Inspection of the coating at the completion of the run, reveals that the coating is somewhat milky, very gummy, and does not have a high degree of adherence to the substrate. Apparently, too large a quantity of styrene condensed on the substrate and the polymerization reaction was producing primarily low molecular weight un-crosslinked polymer.

EXAMPLE VI

In this example, the conditions are identical to those of Example I except that the substrate to receive the coating is maintained at approximately −75° C. This temperature was approximately 84° C. below the condensation temperature of the monomer and the monomer condensed in sufficient layers that adherence to the substrate of the polymerized material was not achieved. In addition, the coating was very runny, indicating an extremely low degree of polymerization.

EXAMPLE VII

In this example, the conditions are identical to those of Example I except that the pressure is now maintained at approximately 1 mm. Hg. and the substrate to receive the coating is maintained at −6° C. At this pressure, the condensation temperature of styrene is −5° C. so that the substrate is maintained one degree lower than the condensation temperature than the monomer. The coating was excellent in appearance in that it was smooth and transparent and adhered well to the substrate under extreme conditions of flexing and bending.

EXAMPLE VIII

In this example, the conditions are substantially identical to those of Example I except that the potential is adjusted so that the current is one-half that of Example I, namely, 50 milliamperes. Inspection reveals that the coatings were excellent, both in esthetic appeal and in their degree of adherence to the substrate under conditions of flexing and bending.

EXAMPLE IX

The conditions in this example are identical to those of Example I except that the voltage is controlled so that the current density is twice that of Example I, namely, 200 milliamperes. Inspection reveals that the coating was extremely foggy in appearance. The coating adhered well to the substrate under conditions of flexing and bending but since the current was double over that of Example I, the coating was somewhat thicker and did not adhere as well as the sample of the Example I.

EXAMPLE X

In this example, three runs are made in order to establish a frequency range for the process. For all the runs, the conditions are identical to those of Example I except that in run $a$, direct current is applied, in run $b$ an alternating current of 10 kilocycles is utilized; and, in run $c$, an alternating current 100 kilocycles is employed. Inspection of the samples produced in run $a$, with the direct current, reveal that the majority of the coating deposited is upon the cathode. The coating produced on the cathode was excellent in that it was smooth, transparent, and adhered well to the substrate under conditions of flexing and bending. In runs $b$ and $c$, the coatings were deposited on both electrodes and although foggy are excellent in adherence to the substrate. Less coating was produced in both runs $a$ and $c$ than in $b$. In run $a$ the glow extinguished itself after about one minute.

EXAMPLE XI

The purpose of this example is to prove the feasibility of polymerization of other vinyl materials in addition to styrene. In this example, methylmethacrylate is utilized as the monomer and at 1 mm. Hg pressure the condensation temperature of methylmethacrylate is −30.5° C. The temperature of the electrodes and substrates are maintained at −33.0° C. which is approximately 2.5° C. below the condensation temperature of the monomer. The current is maintained at 100 milliamperes, with a frequency of 6 kilocycles. The exposure time is two minutes. Inspection reveals that the coatings are excellent in appearance in that they are smooth and transparent and the coatings possess a high degree of adherence to the substrate under conditions of flexing and bending.

EXAMPLE XII

The conditions for this example are identical to those of Example XI except that the temperature of the electrode and substrate is maintained above the condensation temperature of methylmethacrylate, namely, at −28.0° C., which is approximately 2.5° C. above the condensation temperature. Observation of the coatings deposited reveal that the coatings were clear but of much lower weight than in Example XI, indicating that little, if any, monomer condensed on the substrate due to its elevated temperature in relation to the condensation temperature of the monomer.

EXAMPLE XIII

The purpose of this example is to establish the feasibility of polymerizing divinyl benzene under conditions set forth in the invention. The conditions are substantially identical to those of Example XI except that since the condensation temperature of divinyl benzene at 1 mm. Hg pressure is 32.7° C., the temperature of the electrodes and substrates are maintained at 30.0° C. Inspection of the coatings reveal that they are excellent, adhered well to the substrate under conditions of flexing and bending but were not clear and smooth due to the crosslinking produced by the normal reaction of divinyl benzene.

EXAMPLE XIV

The conditions in this example are substantilly identical to those of Example XIII except that the temperature of the electrodes and substrates is raised above the condensation temperature of divinyl benzene, namely, to 34.0° C. Similar to Examples III, IV and XII, little, if any, monomer is condensed upon the substrate due to its elevated temperature so that the coatings are much thinner although possessing a high degree of adherence.

As a general rule, it can be established that increased polymerization rates are achieved if the substrate to receive the coating is maintained at a temperature slightly below its condensation temperature for the particular pressure involved. Gases or vapors are always adsorbed at a thickness of a few molecules on the surface of a substrate exposed to the gas or vapor. Lowering of the temperature of the substrate will generally increase this thickness due to greater condensation of the monomer upon the substrate. If the substrate is maintained at too low a temperature with respect to the condensation temperature of the monomer, then too much monomer condenses upon the substrate and polymerization of all of the condensed material cannot be achieved. Accordingly, the coatings would be gummy and would not adhere well to the substrate. On the other hand, if the electrode or substrate is maintained at a high temperature with regard to the condensaion temperature of the monomer, then substantially no monomer condenses upon the substrate and the thickness of the coating is only achieved through the activated ions which are deposited upon the cathode during the glow discharge. In glow discharge polymerization for producing a coating, it is generally accepted that an ion or activated molecule, produced in the glow region, impinges on the cathode at a high velocity. A portion of this energy of the ion or activated molecule initiates a polymerization with the adsorbed, unactivated gas or vapor condensed upon the substrate. The major portion of the energy is dissipated as heat at the cathode, thus raising the cathode temperature. This rise in temperature decreases the thickness of the adsorbed gas or vapor layer, and thus decreases the number of unactivated molecules available for polymerization.

By circulation of a coolant through the electrode in contact with the substrate to be coated, the heat generated by impingement of the activated molecules may be removed. If the temperature is lowered sufficiently, the vapor molecules will condense to a liquid on the substrate, in addition to the thin layer developed by adsorption. This greatly increases the number of unactivated molecules available for polymerization. If the substrate is cooled to too low a temperature so that too thick a liquid layer is formed, the polymer will be formed only as low molecular weight material at the surface and will not remain as a coating, but will separate upon subsequent warming of the substrate. Experimentation as set forth, reveals that increased deposition rates are achieved by maintaining the substrate temperature slightly below the condensation temperature of the monomer employed. In addition, a substantial current, pressure and frequency range have been established. As a general rule for both D.C. and A.C. operation, an increase in current density leads to an increase in a deposition rate and also to an enhancement in the coating process until an optimum deposition condition is attained. Further increases in the current flow produce no appreciable change in the deposition rate and at the same time may lead to degradation of the deposited coating. By operating within the parameter ranges established herein, those skilled in the electrical arts can arrive at the optimum of conditions for the particular activable gas or vapors employed. Subsequent heating of the coatings and the substrates after removal from the deposition apparatus may produce coatings having higher adherence characteristics than if unheated.

Thus, the present invention may be embodied in other specific forms without departing from the spirit and the essential characteristics of the invention. The present embodiment is, therefore, to be considered in all respects as illustrative, the scope of the invention being indicated by the appended claims rather than the foregoing description, and all changes which come within the meaning and range of the equivalency of the claims are, therefore, intended to be embraced therein.

What is claimed is:
1. A coating process comprising the steps of:
   supporting a pair of substrates in spatial relationship, at least one of which is to receive a coating,
   reducing the pressure in the area about the substrates,
   maintaining the substrate to receive the coating at a temperature less than 10° C. below the condensation temperature of the activable gas to be polymerized,
   introducing the activable gas between the substrates, a portion of the gas condensing upon the substrate to be coated, and
   applying an electrical potential across the substrates to maintain a glow discharge therebetween for producing a polymerized coating upon the substrate to be coated.

2. The process of claim 1 wherein the activable gas is selected from the group consisting of styrene, methyl methacrylate, allyl methacrylate, divinyl benzene and butadiene.

3. The process of claim 1 wherein the pressure in the area about the substrates is maintained in the range of 50 microns to 10 mm. Hg in the area about the substrates.

4. The process of claim 1 wherein the electrical potential applied across the substrates has a voltage range of from 200 to 2,000 volts, a frequency of 0 to 100 kilocycles, and a current density of 0.05 to 7.0 milliamperes per square centimeter and is maintained for an elapsed time in the range of one second to ten minutes to deposit a polymerized coating of the desired thickness upon the substrates.

References Cited

UNITED STATES PATENTS 3,068,510   12/1962   Coleman _____ 204—168
3,205,162    9/1965   MacLean _____ 204—165

ROBERT K. MIHALEK, Primary Examiner

U.S. Cl. X.R.

117—93.1, 106, 132; 204—165, 312